United States Patent [19]

Guillet et al.

[11] Patent Number: 5,013,771
[45] Date of Patent: May 7, 1991

[54] PROCESS FOR THE PRODUCTION OF GLASS FIBER REINFORCED COMPOSITE MATERIAL

[75] Inventors: Antoine Guillet, Divonne-les-Bains, France; Fred D. Osterholtz, Pleasantville, N.Y.

[73] Assignee: Union Carbide Chemicals and Plastics Technology Corporation, Danbury, Conn.

[21] Appl. No.: 454,716

[22] Filed: Dec. 21, 1989

[51] Int. Cl.$^5$ .............................................. C08L 83/00
[52] U.S. Cl. ................................. 523/202; 523/213; 523/208; 523/209; 523/216; 523/217; 524/584; 524/524; 524/523; 524/528; 524/513; 524/509; 524/507
[58] Field of Search ............... 523/202, 213, 208, 209, 523/216, 217; 524/584, 524, 523, 528, 513, 509, 507

[56] References Cited

U.S. PATENT DOCUMENTS

| | | | |
|---|---|---|---|
| 3,258,477 | 6/1966 | Plueddemann | 260/448.8 |
| 3,416,990 | 12/1968 | Robinson | 161/93 |
| 3,646,155 | 2/1972 | Scott | 260/827 |
| 3,773,607 | 11/1973 | Marzocchi | 523/203 |
| 3,849,516 | 11/1974 | Plank | 260/876 R |
| 3,855,175 | 12/1974 | Kakizaki | 523/213 |
| 4,369,264 | 1/1983 | Baumann et al. | 523/217 |
| 4,374,177 | 2/1983 | Hsu et al. | 524/507 |
| 4,451,592 | 5/1984 | Black et al. | 523/206 |
| 4,455,343 | 1/1984 | Temple | 428/285 |
| 4,481,322 | 11/1984 | Godlewski et al. | 524/265 |
| 4,584,138 | 4/1986 | Pepe et al. | 260/404.5 |
| 4,668,716 | 5/1987 | Pepe et al. | 523/213 |

Primary Examiner—Paul R. Michl
Assistant Examiner—Karen A. Hellender
Attorney, Agent, or Firm—Bonnie L. Deppenbrock

[57] ABSTRACT

A glass fiber-reinforced composite material is produced by treating glass fibers with a silane composition comprising silane molecules having amine functional groups and silane molecules having ethylenically-unsaturated functional groups; admixing the treated glass fibers with a polyolefin resin, and a fiber bonding agent comprising a polymerizable unsaturated organic compound having at least two polymerizable unsaturation groups, a vinyl-polymerizable unsaturated, hydrolyzable silane, and a free radical generator, and exposing the resultant mixture to conditions of temperature and pressure sufficient to cause the formation of a glass fiber-reinforced composite material. The use of the silane composition promotes improved impact strength of the composite.

34 Claims, No Drawings

PROCESS FOR THE PRODUCTION OF GLASS FIBER REINFORCED COMPOSITE MATERIAL

FIELD OF THE INVENTION

This invention relates to a process for the production of a glass fiber-reinforced composite material. More specifically, this invention relates to such a process in which a specific silane treatment of the glass fibers promotes improved impact strength of the composite material.

DESCRIPTION OF THE PRIOR ART

It is known to produce composite materials by reinforcing a wide range of plastic materials with glass and other fibers. Among the plastic materials which may be reinforced in this way are polyamides, thermoplastic polyesters, thermosetting resins and polyolefins.

Composite materials with polyolefin matrices and glass fiber reinforcement suffer from poor mechanical performance as compared with similar materials using other types of plastic matrices. This poor mechanical performance may be attributed to the inherent weakness of the adhesion between the polyolefin matrix and the glass fiber. Polyolefins, and especially polypropylene, have extremely low polarities and thus their adhesion to other materials is very poor. For example, it is well known in industry that no paint or sealant will adhere to a polypropylene surface without pre-treatment of that surface.

Attempts have been made to improve the properties of glass fiber-reinforced polyolefins by modifying the surfaces of the glass fiber and/or the polyolefin. For example, U.S. Pat. No. 4,451,592 describes treatment of the glass fiber with a mixture of an aminosilane and a carboxylated polyolefin/latex film forming material, together with treatment of the polyolefin with a carboxylic acid, for example isophthalic or terephthalic acid. In this process, the acid reacts with, and grafts to, the polypropylene chains, while the aminosilane provides basic groups on the surfaces of the glass fibers. Consequently, when the glass fiber contacts the acid-modified polyolefin, a salt-like electrostatic bond is produced between the fiber and the polyolefin, thereby improving the impact strength of the composite material.

It is also known to incorporate acid-grafted polyolefin copolymers into the polyolefin composition, and to use the resultant polyolefin composition with an aminosilane-treated glass fiber to improve the mechanical properties of the composite material. Polypropylene modified in this manner is referred to in the literature as "coupled polypropylene" and is described, inter alia, in U.S. Pat. Nos. 3,416,990 and 3,849,516.

U.S. Pat. No. 4,455,343 to Temple describes a process for the treatment of glass fiber strands which are to be used in reinforcing mats for thermoplastic polymers, including polyolefins. In this process, the glass fiber strands are treated with an aqueous composition comprising a combination of organic silane coupling agents, one silane coupling agent being a vinyl-containing agent and the other a saturated aminosilane coupling agent, the vinyl-containing agent comprising 60 to 99 weight percent, and the aminosilane coupling agent 40 to 1 weight percent, based on the total weight of silane present. The aqueous composition further comprises a heat stable organic peroxide, a glass fiber lubricant and a non-ionic surfactant. A film-forming polymer and/or a softening agent can also be incorporated into the aqueous composition.

U.S. Patent No. 4,481,322 to Godlewski et al., and assigned to the same assignee as the present application, describes a composition for improving the bonding of glass fiber to thermoplastic polymers, including polyolefins; this composition does not depend upon the formation of a salt-like electrostatic bond between the glass fiber and the thermoplastic polymer, but rather upon the formation of a covalent bond between the two. Consequently, when this composition is used with polypropylene, the polypropylene does not need to be coupled or otherwise modified. The composition, which is sold commercially by Union Carbide Corporation under the trade name UCARSIL PC, comprises (a) a polymerizable unsaturated organic compound having at least two polymerizable unsaturation groups; (b) a vinyl-polymerizable unsaturated, hydrolyzable silane; and (c) a free radical generator. This three-part system will hereinafter be referred to as a "covalent fiber bonding agent". The composition is normally added to the glass fiber and polyolefin during the compounding operation. (In the form described in the aforementioned U.S. Pat. No. 4,481,322, the covalent fiber bonding agent also contains an inorganic filler and a surfactant. However, the surfactant may in some cases be omitted, and when the covalent fiber bonding agent is used to produce a glass fiber/polyolefin composite material, the glass fiber takes the place of the inorganic fillers, for example mica, described in the patent.)

The advantages of using covalent fiber bonding agent compositions have been described in the literature; see, Godlewski, Organosilicon Chemicals in Mica-filled Polyolefins, 38th Conference on Reinforced Plastics/Composites, S.P.I., Houston, Texas, Feb. 9, 1983, and Guillet, Chemical Coupling with Silanes in Filled and Reinforced Polyolefins, "Compounding 88" Conference, London, England, February 16–17, 1988. As described in these publications, the covalent fiber-resin bond formed by covalent fiber bonding agents gives the unaged composite mechanical and physical properties equivalent to those obtained with state-of-the-art acid-modified polypropylene/aminetreated glass fiber products, but the covalent fiber bonding agent bonded composites are much more stable under severe environmental conditions. After aging in a humid atmosphere, acid-modified polypropylene/aminetreated glass fiber products show a dramatic decrease in impact resistance; under similar conditions, the covalent fiber bonding agent-bonded products show little or no change in properties.

Since the covalent fiber bonding agent composition acts by radical addition reactions between the silane and the polyolefin, it is not necessary to pre-treat the glass fiber with an aminosilane. Unfortunately, commercially-available glass fiber is usually treated with sizing formulations which are optimized for use with conventional acid-modified polyolefins. Accordingly, in order to obtain optimum performance from covalent fiber bonding agent in the production of polyolefin-based composites, there is a need for a process for pre-treatment of glass fiber which will enhance the ability of the treated fiber to participate in covalent bonding to the polyolefin matrix. The present invention provides a process for the production of a glass fiber-reinforced composite material which incorporates such a pre-treatment of the glass fiber.

SUMMARY OF THE INVENTION

This invention provides a process for the production of a glass fiber-reinforced composite material, which process comprises:

treating glass fibers with a silane composition comprising silane molecules having amine functional groups and silane molecules having ethylenically-unsaturated functional groups;

admixing the treated glass fibers with a polyolefin resin, and a fiber bonding agent comprising (a) from 0.05 to 15 weight percent of a polymerizable unsaturated organic compound having at least two polymerizable unsaturation groups; and (b) from 0.05 to 5 weight percent of a vinyl-polymerizable unsaturated, hydrolyzable silane, the weight percentages of components (a) and (b) being based upon the total weight of the treated glass fibers;

generating free radicals in the resulting mixture in an amount sufficient to cause bonding of the treated glass fibers with the polyolefin resin; and exposing the resultant mixture of glass fibers, polyolefin resin, and fiber bonding agent to conditions of temperature and pressure sufficient to cause the formation of a fiber-reinforced composite material.

The free radicals can be generated by the heat and shear action of the plastic processing equipment or by admixing (c) from 0.0025 to 2.5 weight percent of a free radical generator with the treated glass fibers, polyolefin resin and fiber, the weight percentage being based on the total weight of the treated glass fibers.

This invention also provides a fiber-reinforced composite material comprising:

a polyolefin matrix; and a plurality of glass fibers dispersed throughout the polyolefin matrix, the glass fibers being bonded to the polyolefin matrix by the reaction product of:

a silane composition comprising silane molecules having amine functional groups and silane molecules having ethylenically-unsaturated functional groups; with a fiber bonding agent comprising (a) from 0.05 to 15 weight percent of a polymerizable unsaturated organic compound having at least two polymerizable unsaturation groups; and (b) from 0.05 to 5 weight percent of a vinyl-polymerizable unsaturated, hydrolyzable silane; with or without (c) from 0.0025 to 2.5 weight percent of a free radical generator, the weight percentages of components (a) to (c) being based upon the total weight of the treated glass fibers.

DETAILED DESCRIPTION OF THE INVENTION

In the process of the present invention, the glass fiber is pre-treated with a silane composition which has both amine functional groups and ethylenically-unsaturated functional groups. This silane composition may comprise at least one silane having an amine functional group and an ethylenically-unsaturated functional group in the same molecule. Alternatively, the silane composition may comprise a first silane having an amine functional group and a second silane having an ethylenically-unsaturated functional group.

The preferred silanes having an amine functional group and an ethylenically-unsaturated functional group in the same molecule are those described in U.S. Patents Nos. 4,584,138 and 4,668,716. These silanes are fatty ethenoid acylaminoorganosilane compounds represented by the general formula

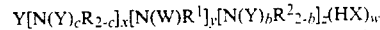

wherein R and R: are individually selected from the group consisting of divalent alkylene groups containing from two to six carbon atoms inclusive, divalent arylene groups containing from six to twelve carbon atoms inclusive, divalent substituted arylene groups containing from seven to twenty carbon atoms inclusive, and divalent groups of the formula -C(=O)R$^3$- wherein R$^3$ is a divalent alkylene group containing from two to six carbon atoms inclusive;

R$^2$ is a monovalent alkyl or aryl group containing from one to ten carbon atoms or hydrogen;

W is either hydrogen or -C(=O)R$^4$- wherein R$^4$ is a monovalent hydrocarbon group containing from 8 to 24 carbon atoms and containing at least one double bond;

Y is selected from the group consisting of hydrogen, -C(=O)R$^4$-, wherein R$^4$ is as defined above, R$^2$ and -R$^5$Si(OR$^6$)$_{30-a}$(R$^7$)$_a$, wherein R$^5$ is a divalent alkylene group containing from two to six carbon atoms inclusive, R$^6$ and R$^7$ are individually a monovalent alkyl or aryl group containing from one to six carbon atoms inclusive; and R$^6$ may also be a silicon containing moiety wherein the oxygen atom is directly bonded to the silicon atom of the R$^6$ silicon containing moiety; a has a value of zero, one or two; b has a value of zero, one or two; c has a value of zero or one; x and y have values such that x +y equals one to thirty, with the proviso that x is at least one; z has a value of zero or one;

X is a halogen atom or an ester hydroxyl or anhydride group;

w has a value equal to from zero to the sum of x +y +z provided that w does not exceed the total nitrogen atom in free amine form;

with the proviso that at least one Y is -R$^5$Si(OR$^6$)$_{3-a}$(R$^7$)$_a$ and at least one other Y is -C(=O)R$^4$; and when x=1, y=0 and z=0, then c=1. Of these silanes, compositions which are synthesized to have two silicones per molecule in a substantial proportion of the silane molecules are preferred, since as disclosed in U.S. Pat. No. 4,668,716, such silanes give better performance. Particularly preferred are linolenylamide silanes with bis-silane structure; specific preferred silanes are [(MeO)$_3$-SiCH$_2$CH$_2$CH$_2$]$_2$[NHCH$_2$CH$_2$NH] and [CH$_3$(CH$_2$CH=CH)$_3$(CH$_2$)$_7$CO][NCH$_2$CH$_2$NH][CH$_2$-CH$_2$CH$_2$Si (OMe)$_3$]$_2$, i.e., a mixture of isomers. A preferred commercially-available bifunctional silane composition is that sold under the trade name Y-9708 by Union Carbide Corporation.

When the silane composition comprises a first silane having an amine functional group and a second silane having an ethylenically-unsaturated functional group, preferred aminosilanes are (the "A" and "Y" numbers following the chemical names of compounds below are the trade names under which these products are sold by Union Carbide Corporation)

τ-aminopropyltriethoxysilane (A-1100),
τ-aminopropyltrimethoxysilane (A-1110),
bis(trimethoxysilylpropyl)amine (Y-9492),
1,2-bis-(trimethoxysilylpropyl)ethanediamine, and isomers thereof, and trimethoxysilylpropyl substituted diethylene triamine (A-1130), with
τ-aminopropyltriethoxysilane and
τ-aminopropyltrimethoxysilane being especially preferred.

Preferred ethylenically-unsaturated silanes are vinyl silanes, for example vinyltrimethoxysilane (A-171), vinyltriethoxysilane (A-151), vinyl tris(2-methoxyethoxy)silane (A-172) and τ-methacryloxypropyltrimethoxysilane (A-174).

Although the covalent fiber bonding agent does not have to contain a surfactant, it is preferred that the fiber bonding agent comprise not more than about 2.5 weight percent, based upon the weight of the glass fiber, of a surfactant comprising:

(i) a siloxane containing at least one silicon-bonded alkyl group having at least 12 carbon atoms; or (ii) a polyoxyalkylene compound having one or more polyoxyalkylene blocks each bonded at one end to a siloxane block, an alkyl group having at least 12 carbon atoms, or an alkenyl group, and bonded at the other end to an alkoxy group, siloxane block or a hydroxy group. The fiber bonding agent may also usefully contain not more than about 15 weight percent, based upon the weight of the glass fiber, of an inert inorganic carrier; preferred inorganic carriers are porous silica, silicates, alumina, aluminosilicates and polymeric materials.

The amount of silane which should be applied to the glass fibers in the present process is similar to that used in the prior art processes described above, and the optimum amount for any particular silane composition and glass fiber combination can easily be determined by routine empirical tests. In general, the use of a quantity of silane equal to 0.01 to 1 percent by weight of the glass fibers is recommended. Where the silane composition comprises a first silane having an amine functional group and a second silane having an ethylenically-unsaturated functional group, the mole ratio of first silane to second silane can vary within a wide range, but will typically be in the range of 1:9 to 9:1. The optimum ratio for any particular composition can easily be determined by routine empirical tests. However, in as much as a minor proportion of the aminosilane can act as a catalyst, it is generally recommended that the silane composition comprise a minor proportion of the aminosilane and a major proportion of the unsaturated silane.

As is conventional in the art, in the present process the silane composition may have the form of a size bath containing components other than the silane(s). Desirably, such a size bath may contain from 0.1 to 2 percent by weight of silane. Typically, such a size bath also comprises a film-forming material, for example at least one of a polyvinyl acetate, an acrylate, a polyolefin, a polyester, a phenoxy resin, a phenol-formaldehyde resin, a urea, a polyurethane, and an epoxy resin. The preferred film-forming materials for use in the present process are epoxy resins, since epoxy resins react with aminosilanes and this addition reaction may confer additional benefits in increasing the impact strength of the composite material. Preferably, the film-forming material comprises from 1 to 20 percent by weight of the size bath.

Application of the silane composition to the glass fiber may be effected by any of the conventional techniques known to persons skilled in the art. Thus, the glass fiber being treated may be in the form of continuous strands of glass fiber, continuous glass fibers, rovings, mat, fabric or chopped fiber strands. The silane composition may be applied to the glass fiber directly after fiber formation through a roll applicator. Alternatively, the silane composition may be applied by spraying or dipping the glass fiber in the silane composition, either as the glass fiber is formed or after drying of the glass fiber.

As already mentioned, the silane composition may be incorporated into a size bath containing additional components such as film-forming materials. Alternatively, the silane composition and a conventional size bath may be applied separately to the glass fiber, as for example by means of a double-roll applicator, or by two separate applicator systems for spraying, dipping or post-treatment of the glass fibers after drying. However, it should be noted that the performance of certain combinations of silanes and other size bath components may vary depending upon whether they are applied together from a single size bath or separately. Some size baths are not mere mixtures and substantial interactions may occur between the silanes and other components of the bath, especially the film-forming materials. In particular, aminosilanes will add to the preferred epoxy resins used in a size bath. The same is true of isocyanate prepolymers and formaldehyde resins. When any of these film-forming materials are used with aminosilanes in a size bath, the order of addition of the silanes and film-forming materials may affect the performance of the final composite materials. As shown in detail in the Examples below, the influence of the film-forming material is important and varies with its concentration; there appears to be a specific optimum concentration for any given film-forming material, which varies with the type of material.

Whether the silane composition is in the form of a size bath or not, this composition may include water or organic solvents. When silane is to be included in an aqueous composition, the silane should be added to the water, not the reverse. Furthermore, when silane is to be incorporated into an aqueous size bath containing other components, desirably the silane is hydrolyzed separately and thereafter added to the remaining components of the size bath.

Although other polyolefins, such as polyethylene and copolymers of ethylene and propylene can be used in the present process, the preferred polyolefin resin is polypropylene.

Details of the covalent fiber bonding agents used in the present invention are fully set forth in the aforementioned U.S. Pat. No. 4,481,322 to Godlewski, the entire disclosure of which is herein incorporated by reference, and accordingly, these compositions will not be described in detail herein. In the covalent fiber bonding agents, the polymerizable unsaturated organic compound having at least two polymerizable unsaturation groups is desirably one or more tri-, tetra- or pentaacrylates of poly(vinyl alcohol), pentaerythritol, methylolpropane, dipentaerythritol or tri-, tetra- or pentamethacrylates of pentaerythritol, methylolpropane, or dipentaerythritol. The vinyl-polymerizable unsaturated, hydrolyzable silane is desirably any one or more of τ-methacryloxypropyltrimethoxysilane, vinyltriethoxysilane, vinyltri(2-methoxyethoxy)silane, vinyltrimethoxysilane, vinyltrichlorosilane, τ-acryloxypropyltriethoxysilane, vinyltriacetoxysilane, ethynyltriethoxysilane and 2-propynyltrichlorosilane.

The free radical generator is desirably any one or more of dicumyl peroxide, lauryl peroxide, azobisisobutyronitrile, benzoylperoxide, tertiary butyl perbenzoate, di(tertiary butyl) peroxide, cumene hydroperoxide, 2,5-dimethyl-2,5-di(t-butylperoxy)-hexane, tertiary butyl hydroperoxide and isopropyl percarbonate. Alternatively, the free radicals can be generated by the heat and shear action of the plastic processing equipment (e.g. the extruders used to mix the polyolefin and glass fiber) thereby reducing or eliminating the need for added chemical free radical generator.

The following Examples are now given, though by way of illustration only, to show details of preferred reagents, conditions and techniques used in the process of the present invention. All parts and proportions are by weight unless otherwise stated. Abbreviations and protocols used in these Examples are as follows:

LOI - Loss on ignition at 540° C. for two hours $$\text{Migration index} = \frac{LOI(\text{outside}) + LOI(\text{inside})}{2 \times \text{mean } LOI}$$

where (outside) and (inside) refer to the inner and outer surfaces of the forming cake as described in Example 1, Part B.

Tensile properties - according to ISO R 527-67, using Type I specimens at 23.C and an extension rate of 50mm/min.

Charpy Impact Strength - according to ISO 179-82, using unnotched specimens

Heat Distortion Temperature (HDT) - according to ISO 75×74, using 110 x 10 x 4 mm. specimens at 0.32 mm. deflection under 1820 MPa. load, after preconditioning for 3 minutes at 150° C., the preconditioning being found necessary to secure reproducible results.

Two distinct loss on ignition tests are used in the following Examples. The first, which is identified as "Glass fiber LOI", is determined by ignition of the glass fiber alone and simply measures the size on the glass fiber. The second, identified as "Composite LOI", is determined by ignition of the final composite material, and the major loss of weight is of course caused by burning off the polyolefin matrix of the composite material. Thus, the composite LOI measures the proportions of polyolefin and glass fiber in the composite material.

EXAMPLE 1

This Example illustrates a process of the invention in which the silane composition comprises a single silane having both amino and vinyl functional groups.

A. Preparation of size bath

50 G. of a linolenylamidosilane were added under agitation to 2500 g. of distilled water and the resultant mixture left to hydrolyze for 30 minutes at pH 6. After the silane addition, the pH was adjusted to this value using dilute acetic acid.

Separately, 150 g. of a self-dispersible epoxy resin (Epikote 255, sold by Shell Oil Company), diluted with 7 g. of acetone, were slowly added, under strong agitation, to another 2500 g. of distilled water preheated to 40.C The resultant dispersion was allowed to cool and admixed with the silane solution. Finally, the pH was adjusted to 5.0 with dilute acetic acid to produce the final size bath.

B. Preparation of sized glass fiber

Glass fiber was formed from an E-glass with the following composition:

| | |
|---|---|
| $SiO_2$ | 54.4 |
| $Na_2O$ | 0.5 |
| $K_2O$ | 0.2 |
| $Al_2O_3$ | 14.1 |
| $Fe_2O_3$ | 0.2 |
| $MgO$ | 0.4 |
| $CaO$ | 22.4 |
| $B_2O_3$ | 8.0 |
| $F_2$ | 0.4. |

From this glass composition, glass fibers having a nominal titer of 68 Tex (corresponding to a filament diameter of 13 microns) were drawn using a 204-hole marble bushing, a bottom plate temperature of 1200° C., a drawing speed of 1200 m/min. and a drawing time of 4 minutes, to give a glass output of 80 g/min. and a forming cake weight of 330 g. The size bath prepared in A above was applied by means of a roll-applicator operating at 8 m/min. to the fibers immediately after fiber formation. 40 cakes were prepared and dried in an oven at 100° C. for 10 hours and then at 120° C. for 2 hours.

The oven was then cooled to 40° C. and the cakes removed. Rovings of about 2400 Tex were prepared from 36 cakes, using a winding speed of 30 m/min. The winding speed was limited by fiber sticking, loop formation and deposits on the braking plates, although the rovings were of the correct shape, with a slight yellowing on their surfaces. The fiber properties were as follows:

| | |
|---|---|
| Glass fiber LOI | 0.46% |
| Migration index | 1.9 |
| Fiber titer | 62 Tex |
| Tensile strength | 53 cN/tex |

(using 500 mm. specimens at an extension speed of 200 mm/min.).

C. Compounding and injection molding of the composite

The rovings prepared in B above were then compounded with polypropylene homopolymer (Moplen C 30 G, having an MFI (230.C, 2.16) of 6 dg/min) in a Comac Plast EB-386 extruder having 38 mm. twin screws with a length/diameter ratio of 25:1. The extruder was operated at 100 rpm., at a melt temperature of 225° C. and a melt pressure of 49 Bar. The temperature profile within the extruder was as follows:

| | |
|---|---|
| Polymer feed | 238° C. |
| Zone 2 | 240° C. |
| Zone 3 | 235° C. |
| Fiber feed | 230° C. |
| Zone 5 | 230° C. |
| Nozzle | 220° C. |
| Die | 220° C. |

The covalent fiber bonding agent used in the process comprised a mixture of 4 parts of a 1:1 blend of substantially equal amounts of trimethylolpropane triacrylate and τ-methacryloxypropyltrimethoxysilane, with 1 part by weight of an 8% solution of dicumyl peroxide in vinyltriethoxysilane. For ease of handling, this liquid mixture was blended with an equal weight of an inert carrier (sold by Degussa under the trade name SIPERNAT 22) to form a 50% dry powder concentrate.

The proportions used in the extruder were 67.6% of the polypropylene, 30% of the glass fiber roving and 2.4% of the dry powder concentrate containing the covalent fiber bonding agent. The polypropylene was mixed with the covalent fiber bonding agent concentrate and the resultant mixture fed as pellets through a volumetric feeder, and metered into the compounding line. (The covalent fiber bonding agent may be mixed with the other components of the composite material in other ways. For example, the covalent fiber bonding agent may be added to the glass fibers, whether the glass fiber is being introduced separately into the extruder or added in chopped form to the same hopper as the polyolefin.) The sized glass fibers were introduced at the end of the melting zone as 4 x 2400 Tex rovings. The extrudate was cooled in a water bath and chopped into pellets.

The pellets of composite thus obtained were injection-molded in a 75 Ton Arburg Allrounder press using an Arbid screw and cylinder with a diameter of 30 mm. and a length/diameter ratio of 20, using a screw speed of 30 rpm., a cycle time of 55 seconds and the following temperature profile:

| Feed | 220° C. |
|---|---|
| Zone 2 | 218° C. |
| Zone 3 | 220° C. |
| Nozzle | 220° C. |
| Mold | 60° C. |

D. Properties of composite

The molded composite material had the following properties:

| Composite LOI | 70% |
|---|---|
| Tensile strength at yield | 99 MPa. |
| Tensile elongation | 1.8% |
| Flexural strength at yield | 112 MPa. |
| Flexural modulus | 4190 MPa. |
| Unnotched Charpy impact | 36 J/m$^2$ |
| HDT | 161° C. |
| MFI (230° C. 21.6 N) | 5.2 g/10 min. |

COMPARATIVE EXAMPLE A

This Example illustrates that the use of a silane containing only amino functional groups and not unsaturated functional groups does not produce composite properties as good as those achieved in Example 1 above.

Example 1 was repeated except that the size bath had the following composition:

| τ-Aminopropyltriethoxysilane | 0.6% |
|---|---|
| Epikote 255 | 3.0% |
| Water | 96.4% |

The molded composite material produced had the following properties:

| Composite LOI | 69% |
|---|---|
| Tensile strength at yield | 98 MPa. |
| Tensile elongation | 2.2% |
| Flexural strength at yield | 110 MPa. |
| Flexural modulus | 4470 MPa. |
| Unnotched Charpy impact | 25 J/m$^2$ |
| HDT | 161° C. |
| MFI (230° C. 21.6 N) | 5.6 g/10 min. |

Upon comparing these values with those given in Example 1 above, it will be seen that although many of the properties of the two compositions were similar, the control composition, in which the silane did not possess unsaturated functional groups, had a Charpy impact strength only about 70% of that achieved in Example 1.

EXAMPLE 2

This Example illustrates a process of the invention in which the silane composition comprises a single silane having both amino and vinyl functional groups, but in which the film-forming material used in the size bath is different from that used in Example 1.

Example 1 was repeated except that the Epikote 255 was replaced by Hordamer PE-03, an oxidized polyethylene emulsion sold by Hoechst Corporation. Thus, the composition of the size bath was as follows:

| Silane | 1.0% |
|---|---|
| Hordamer PE 03 Film-former | 3.0% |
| Water | 96.0% |

The use of the oxidized polyethylene emulsion film-forming material had the advantage that no processing problems were encountered in the production of rovings, so the rovings could be wound at 300 m/min., and the rovings were of good quality.

The properties of the resultant composite were as follows:

| τ-Aminopropyltriethoxysilane | 0.6% |
|---|---|
| Hordamer PE-03 | 3.0% |
| Water | 96.4% |

COMPARATIVE EXAMPLE B

This Example demonstrates that the use of a silane containing only amino functional groups and not unsaturated functional groups does not produce composite properties as good as those achieved in Example 2 above.

Example 2 was repeated except that the silane was replaced with that used in Comparative Example A above so that the size bath had the following composition:

| Composite LOI | 71% |
|---|---|
| Tensile strength at yield | 97 MPa. |
| Tensile elongation | 1.8% |
| Flexural strength at yield | 112 MPa. |
| Flexural modulus | 4500 MPa. |
| Unnotched Charpy impact | 25 J/m$^2$ |
| HDT | 160° C. |
| MFI (230° C. 21.6 N) | 4.7 g/10 min. |

The molded composite material produced had the following properties:

| Composite LOI | 68% |
|---|---|
| Tensile strength at yield | 90 MPa. |
| Tensile elongation | 1.7% |
| Flexural strength at yield | 107 MPa. |
| Flexural modulus | 4970 MPa. |
| Unnotched Charpy impact | 20 J/m$^2$ |
| HDT | 160° C. |
| MFI (230° C. 21.6 N) | 4.4 g/10 min. |

Upon comparing these values with those given in Example 2 above, it will be seen that although many of the properties of the two compositions were similar, the control composition, in which the silane did not possess unsaturated functional groups, had a Charpy impact strength only 80% of that achieved in Example 2.

COMPARATIVE EXAMPLE C

This Example illustrates that the use of a commercial glass fiber roving (which has presumably been treated for use with acid-modified polyolefins) does not produce composite properties as good as those achieved in Example 1 above.

Example 1 was repeated except that the rovings were replaced with Vetrotex P 365, a commercially-available glass fiber roving. The molded composite material produced had the following properties:

| | |
|---|---|
| Composite LOI | 69% |
| Tensile strength at yield | 88 MPa. |
| Tensile elongation | 2.0% |
| Flexural strength at yield | 100 MPa. |
| Flexural modulus | 4170 MPa. |
| Unnotched Charpy impact | 22 J/m$^2$ |
| HDT | 160° C. |
| MFI (230° C. 21.6 N) | 4.4 g/10 min. |

Upon comparing these values with those given in Example 1 above, it will be seen that although many of the properties of the two compositions were similar, the control composition had a Charpy impact strength only about 60% of that achieved in Example 1.

EXAMPLES 3 AND 4 AND COMPARATIVE EXAMPLES D AND E

These Examples illustrates processes of the invention in which the silane composition comprises a first silane having amino functional groups and a second silane having vinyl functional groups. For comparison, comparative Examples are provided in which each of these two silanes were used alone in similar size baths.

Example 1 was repeated, except that the silane used was (the proportions given are percent of each silane in the size bath):

Example 3 : A mixture of 0.35% of vinyl tris(2-methoxyethoxy)silane and 0.30% of τ-aminopropyltriethoxysilane; Example 4 : A mixture of 0.30% of methacryloxypropyltrimethoxy and 0.30% of τ-aminopropyltriethoxysilane; Comparative Example D : 0.7% of vinyl tris(2-methoxyethoxy)silane; and Comparative Example E : 0.6% of methacryloxypropyltrimethoxy.

The properties of the composites produced are shown in the Table below. For convenience, this Table also repeats the results from Comparative Example A above, in which the silane used was 0.6% of τ-aminopropyltriethoxysilane.

| | Example 3 | Example 4 | Comp. Ex. D | Comp. Ex. E | Comp. Ex. A |
|---|---|---|---|---|---|
| LOI (%) | 31 | 30 | 31 | 32 | 31 |
| Tensile strength (MPa.) | 102 | 100 | 96 | 95 | 98 |
| Tensile elongation (%) | 2.6 | 2.4 | 1.4 | 0.5 | 2.2 |
| Flexural strength (MPa.) | 112 | 110 | 110 | 106 | 110 |
| Flexural modulus (MPa.) | 4230 | 3940 | 4560 | 4310 | 4470 |
| Charpy impact (J/m$^2$) | 35 | 33 | 23 | 23 | 25 |

-continued

| | Example 3 | Example 4 | Comp. Ex. D | Comp. Ex. E | Comp. Ex. A |
|---|---|---|---|---|---|
| HDT (160° C.) | 161 | 161 | 162 | 161 | 161 |
| MFI (g/10 min.) | — | — | 8.2 | 5.3 | 5.6 |

From the data in the Table above, it will be seen that the mixtures of aminosilanes and vinylsilanes used in Examples 3 and 4 produced substantially greater Charpy impact strengths than any of the constituent silanes did singly.

We claim:

1. A process for the production of a glass fiber-reinforced composite material, which process comprises:
   treating glass fibers with a silane composition comprising silane molecules having amine functional groups and silane molecules having ethylenically-unsaturated functional groups;
   admixing the treated glass fibers with a polyolefin resin, and a fiber bonding agent comprising (a) from 0.05 to 15 weight percent of a polymerizable unsaturated organic compound having at least two polymerizable unsaturation groups and (b) from 0.05 to 5 weight percent of a vinyl-polymerizable unsaturated, hydrolyzable silane;
   the weight percentages of components (a) and (b) being based upon the total weight of the treated glass fibers;
   generating free radicals in the resulting mixture in an amount sufficient to cause bonding of the treated glass fibers with the polyolefin resin; and
   exposing the resultant mixture of glass fibers, polyolefin resin, and fiber bonding agent to conditions of temperature and pressure sufficient to cause the formation of a fiber-reinforced composite material.

2. A process for the production of a glass fiber-reinforced composite material, which process comprises:
   treating glass fibers with a silane composition comprising silane molecules having amine functional groups and silane molecules having ethylenically-unsaturated functional groups;
   admixing the treated glass fibers with a polyolefin resin, and a fiber bonding agent comprising (a) from 0.05 to 15 weight percent of a polymerizable unsaturated organic compound having at least two polymerizable unsaturation groups; (b) from 0.05 to 5 weight percent of a vinyl-polymerizable unsaturated, hydrolyzable silane; and (c) from 0.0025 to 2.5 weight percent of a free radical generator,
   the weight percentages of components (a) to (c) being based upon the total weight of the treated glass fibers; and
   exposing the resultant mixture of glass fibers, polyolefin resin, and fiber bonding agent to conditions of temperature and pressure sufficient to cause the formation of a fiber-reinforced composite material.

3. A process according to claim 2 wherein the silane composition comprises at least one silane having an amine functional group and an ethylenically-unsaturated functional group in the same molecule.

4. A process according to wherein the silane composition comprises any one fatty ethenoid acylaminoorganoosilane compound represented by the general formula

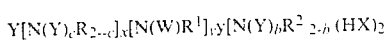

wherein R and $R_1$ are individually selected from the group consisting of divalent alkylene groups containing from two to six carbon atoms inclusive, divalent arylene groups containing from six to twelve carbon atoms inclusive, divalent substituted arylene groups containing from seven to twenty carbon atoms inclusive, and a divalent groups of the formula -C(=O)$R^3$- wherein $R^3$ is a divalent alkylene group containing from two to six carbon atoms inclusive;

$R^2$ is a monovalent alkyl or aryl group containing from one to ten carbon atoms or hydrogen;

W is either hydrogen or -C(=O)$R^4$- wherein $R^4$ is a monovalent hydrocarbon group containing from 8 to 24 carbon atoms and containing at least one double bond;

Y is selected from the group consisting of hydrogen, -C(=O)$R^4$, wherein $R^4$ is as defined above, $R^2$ and -$R^5$Si(O$R^6$)$_{3-a}$($R^7$)$_a$, wherein $R^5$ is a divalent alkylene group containing from two to six carbon atoms inclusive, $R^6$ and $R^7$ are individually a monovalent alkyl or aryl group containing from one to six carbon atoms inclusive; and $R^6$ may also be a silicon containing moiety wherein the oxygen atom is directly bonded to the silicon atom of the $R^6$ silicon containing moiety; a has a value of zero, one or two; b has a value of zero, one or two; c has a value of zero or one; x and y have values such that x+y equals one to thirty, with the proviso that x is at least one; z has a value of zero or one;

X is a halogen atom or an ester hydroxyl or anhydride group;

w has a value equal to from zero to the sum of x+y+z provided that w does not exceed the total nitrogen atom in free amine form;

with the proviso that at least one Y is -$R^5$Si(O$R^6$)$_{30-a}$($R^7$)$_a$ and at least one other Y is -C(=O)$R^4$-; and when x =1, y =0 and z =0, then c =1.

5. A process according to claim 4 wherein the silane composition comprises [$CH_3(CH_2CH=CH)_3(CH_2)_7CO$][$NCH_2CH_2NH$][$CH_2CH_2CH_2Si(OMe)_3$]$_2$.

6. A process according to claim 2 wherein the silane composition comprises a first silane having an amine functional group and a second silane having an ethylenically-unsaturated functional group.

7. A process according to claim 6 wherein the first silane is at least one of
τ-aminopropyltriethoxysilane,
τ-aminopropyltrimethoxysilane,
bis(trimethoxysilylpropyl)amine,
1,2-bis-(trimethoxysilylpropyl)ethanediamine, and isomers thereof, or trimethoxysilylpropyl substituted diethylene triamine.

8. A process according to claim 7 wherein the first silane is at least one of
τ-aminopropyltriethoxysilane or
τ-aminopropyltrimethoxysilane.

9. A process according to claim 6 wherein the second silane is a vinyl silane.

10. A process according to claim 9 wherein the second silane is at least one of vinyltrimethoxysilane, vinyltriethoxysilane, vinyl tris(2-methoxyethoxy)silane or τ-methacryloxypropyltrimethoxysilane.

11. A process according to claim 2 wherein the fiber bonding agent further comprises not more than about 2.5 weight percent, based upon the weight of the glass fiber, of a surfactant comprising:

(i) a siloxane containing at least one silicon-bonded alkyl group having at least 12 carbon atoms; or (ii) a polyoxyalkylene compound having one or more polyoxyalkylene blocks each bonded at one end to a siloxane block, an alkyl group having at least 12 carbon atoms, or an alkenyl group, and bonded at the other end to an alkoxy group, siloxane block or a hydroxy group.

12. A process according to claim 2 wherein the fiber bonding agent further comprises not more than about 15 weight percent, based upon the weight of the glass fiber, of an inert carrier.

13. A process according to claim 12 wherein the inert inorganic carrier comprises any one or more of porous silica, a silicates, alumina, an or a polymeric material.

14. A process according to claim 2 wherein the glass fibers are treated with a quantity of silane equal to 0.01 to 1 percent by weight of the glass fibers.

15. A process according to claim 2 wherein the glass fibers are treated with a size bath containing from 0.1 to 2 percent by weight of silane.

16. A process according to claim 9 wherein the size bath further comprises a film-forming material.

17. A process according to claim 16 wherein the film-forming material comprises at least one of a polyvinyl acetate, an acrylate, a polyolefin, a polyester, a phenol-formaldehyde resin, a urea, a polyurethane, an epoxy resin or a phenoxy resin.

18. A process according to claim 17 wherein the film-forming material comprises at least one epoxy resin.

19. A process according to claim 17 wherein the film-forming material comprises from 1 to 20 percent by weight of the size bath.

20. A process according to claim 2 wherein the polyolefin resin is polypropylene.

21. A process according to claim 2 wherein, in the fiber bonding agent, the polymerizable unsaturated organic compound having at least two polymerizable unsaturation groups is selected from the group consisting of the tri-, tetra- and penta-acrylates of poly(vinyl alcohol), pentaerythritol, methylolpropane, and dipentaerythritol and the tri-, tetra- and penta-methacrylates of pentaerythritol, methylolpropane, and dipentaerythritol.

22. A process according to claim 2 wherein, in the fiber bonding agent, the vinyl-polymerizable unsaturated, hydrolyzable silane is selected from the group consisting of
τ-methacryloxypropyltrimethoxysilane, vinyltriethoxysilane, vinyltri(2-methoxyethoxy)silane, vinyltrimethoxysilane, vinyltrichlorosilane, τ-acryl-oxypropyltriethoxysilane, vinyltriacetoxysilane, ethynyltriethoxysilane and 2-propynyltrichlorosilane.

23. A process according to claim 2 wherein, in the fiber bonding agent, the free radical generator is selected from the group consisting of dicumyl peroxide, lauryl peroxide, azobisisobutyronitrile, benzoyl peroxide, tertiary butyl perbenzoate, di(tertiary butyl) peroxide, cumene hydroperoxide, 2,5-dimethyl-2,5-di(t-butylperoxy)hexane, tertiary butyl hydroperoxide and isopropyl percarbonate.

24. A process according to claim 2 wherein the fiber bonding agent is added in a pulverulent form produced by absorption of the liquid components of the fiber bonding agent on to a porous inert carrier.

25. A fiber-reinforced composite material produced by a process according to claim 2.

26. A fiber-reinforced composite material comprising:
a polyolefin matrix; and
a plurality of glass fibers dispersed throughout the polyolefin matrix,
the glass fibers being bonded to the polyolefin matrix by the reaction product of:
a silane composition comprising silane molecules having amine functional groups and silane molecules having ethylenically-unsaturated functional groups; with
a fiber bonding agent comprising (a) from 0.05 to 15 weight percent of a polymerizable unsaturated organic compound having at least two polymerizable unsaturation groups; and (b) from 0.05 to 5 weight percent of a vinyl-polymerizable unsaturated, hydrolyzable silane; with or without (c) from 0.0025 to 2.5 weight percent of a free radical generator,
the weight percentages of components (a) to (c) being based upon the total weight of the treated glass fibers.

27. A fiber-reinforced composite material according to claim 26 wherein the reaction product is derived from a silane composition comprising at least one silane having an amine functional group and an ethylenically-unsaturated functional group in the same molecule.

28. A fiber-reinforced composite material according to claim 27 wherein the silane composition comprises any one fatty ethenoid acylaminoorganoosilane compound represented by the general formula

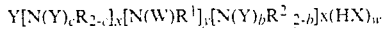

wherein R and $R^1$ are individually selected from the group consisting of divalent alkylene groups containing from two to six carbon atoms inclusive, divalent arylene groups containing from six to twelve carbon atoms inclusive, divalent substituted arylene groups containing from seven to twenty carbon atoms inclusive, and a divalent groups of the formula -C(=O)$R^3$- wherein
$R^3$ is a divalent alkylene group containing from two to six carbon atoms inclusive;
$R^2$ is a monovalent alkyl or aryl group containing from one to ten carbon atoms or hydrogen; W is either hydrogen or -C(=O)$R^4$- wherein $R^4$ is a monovalent hydrocarbon group containing from 8 to 24 carbon atoms and containing at least one double bond;
Y is selected from the group consisting of hydrogen, -C(=O)$R^4$-, wherein $R^4$ is as defined above, $R^2$ and -$R^5$Si(O$R^6$)$_a$,($R^7$)$_a$, wherein $R^5$ is a divalent alkylene group containing from two to six carbon atoms inclusive, $R^6$ and $R^7$ are individually a monovalent alkyl or aryl group containing from one to six carbon atoms inclusive; and $R^6$ may also be a silicon containing moiety wherein the oxygen atom is directly bonded to the silicon atom of the $R^6$ silicon containing moiety; a has a value of zero, one or two; b has a value of zero, one or two; c has a value of zero or one; x and y have values such that $x + y$ equals one to thirty, with the proviso that x is at least one; z has a value of zero or one;
X is a halogen atom or an ester hydroxyl or anhydride group;
w has a value equal to from zero to the sum of $x + y + z$ provided that w does not exceed the total nitrogen atom in free amine form;
with the proviso that at least one Y is -$R^5$Si(O$R^6$)$_{3a}$($R^7$)$_a$ and at least one other Y is -C(•O)$R^4$-; and when $x = 1$, $y = 0$ and $z = 0$, then $c = 1$.

29. A fiber-reinforced composite material according to claim 28 wherein the silane composition comprises

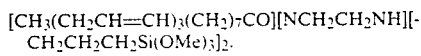

30. A fiber-reinforced composite material according to claim 26 wherein the reaction product is derived from a silane composition comprising a first silane having an amine functional group and a second silane having an ethylenically-unsaturated functional group.

31. A fiber-reinforced composite material according to claim 30 wherein the first silane is at least one of τ-aminopropyltriethoxysilane, τ-aminopropyltrimethoxysilane, bis(trimethoxysilylpropyl)amine, 1,2-bis-(trimethoxysilylpropyl)ethanediamine, or isomers thereof, and trimethoxysilylpropyl substituted diethylene triamine.

32. A fiber-reinforced composite material according to claim 31 wherein the first silane is at least one of τ-aminopropyltriethoxysilane or τ-aminopropyltrimethoxysilane.

33. A fiber-reinforced composite material according to claim 30 wherein the second silane is a vinyl silane.

34. A process according to claim 9 wherein the second silane is at least one of vinyltrimethoxysilane, vinyltriethoxysilane, vinyl tris(2-methoxyethoxy)silane or τ-methacryloxypropyltrimethoxysilane.

* * * * *

UNITED STATES PATENT AND TRADEMARK OFFICE
CERTIFICATE OF CORRECTION

PATENT NO. : 5,013,771

DATED : May 7, 1991

INVENTOR(S) : Antoine Guillet; Fred D. Osterholtz

It is certified that error appears in the above-identified patent and that said Letters Patent is hereby corrected as shown below:

Column 4, line 6: "R:" should read --$R^1$--.

Column 4, line 22: "$-R^5Si(OR^6)_{30-a}(R^7)_a$" should read -- $-R^5Si(OR^6)_{3-a}(R^7)_a$ --.

Column 7, line 26: "ISO 75X74" should read --ISO 75-74--.

Column 10, line 29: delete

| | |
|---|---|
| "T-Aminopropyltriethoxysilane | 0.6% |
| Hordamer PE-03 | 3.0% |
| Water | 96.4%" | and insert therefor:

| | | |
|---|---|---|
| --Composite LoI | : | 71% |
| Tensile strength at yield | : | 97 Mpa. |
| Tensile elongation | : | 1.8% |
| Flexural strength at yield | : | 112 MPa. |
| Flexural modulus | : | 4500 MPa. |
| Unnotched Charpy impact | : | 25 $J/m^2$ |
| HDT | : | 160°C |
| MFI (230°C 21.6N) | : | 4.7g/10min.-- |

UNITED STATES PATENT AND TRADEMARK OFFICE
CERTIFICATE OF CORRECTION

PATENT NO. : 5,013,771
DATED : May 7, 1991
INVENTOR(S) : Antoine Guillet; Fred D. Osterholtz It is certified that error appears in the above-identified patent and that said Letters Patent is hereby corrected as shown below:

Column 10, line 47: delete

"Composite Loi : 71%

Tensile strength at yield : 97 Mpa.

Tensile elongation : 1.8%

Flexural strength at yield : 112 MPa.

Flexural modulus : 4500 MPa.

Unnotched Charpy impact : 25 J/m$^2$

HDT : 160°C

MFI (230°C 21.6N) : 4.7g/10min."

and insert therefor

--T-Aminopropyltriethoxysilane 0.6%

Hordamer PE-03 3.0%

Water 96.4%--.

Column 12, line 63, (Claim 4): delete "according to".

Column 12, line 67, (Claim 4):

"$Y[N(Y)_c R^2_{2-c}]_x [N(W)R^1]_y [N(Y)_b R^2_{2-b}(HX)_2$" should read

--$Y[N(Y)_c R_{2-c}]_x [N(W)R^1]_y [N(Y)_b R^2_{2-b}]_z (HX)_w$--.

UNITED STATES PATENT AND TRADEMARK OFFICE
CERTIFICATE OF CORRECTION

PATENT NO. : 5,013,771
DATED : May 7, 1991
INVENTOR(S) : Antoine Guillet; Fred D. Osterholtz It is certified that error appears in the above-identified patent and that said Letters Patent is hereby corrected as shown below:

Column 13, line 1, (Claim 4): "$R_1'$" should read --$R^1$--.

Column 13, line 36, (Claim 4): "Y is $R^5Si(OR^6)_{30-a}$" should read --Y is -$R^5Si(OR^6)_{3-a}(R^7)_a$--.

Column 15, line 36, (Claim 28): "$Y[N(Y)_cR_{2-c}]_x[N(W)R^1]_y[N(Y)_bR^2_{2-b}]x(HX)_w$" should read --$Y[N(Y)_cR_{2-c}]_x[N(W)R^1]_y[N(Y)_bR^2_{2-b}]_z(HX)_w$--.

Column 16, line 3, (Claim 28): "-$R^5Si(OR^6)_a(R^7)_a$" should read -- -$R^5Si(OR^6)_{3-a}(R^7)_a$--.

Column 16, lines 20-21, (Claim 28): "Y is -$R^5Si(OR^6)_{3a}(R^7)_a$" should read --Y is -$R^5Si(OR^6)_{3-a}(R^7)_a$--.

Column 16, line 21, (Claim 28): "Y is -C(·O)$R^4$-" should read --Y is -C(=O)$R^4$- --.

UNITED STATES PATENT AND TRADEMARK OFFICE
CERTIFICATE OF CORRECTION

PATENT NO. : 5,013,771
DATED : May 7, 1991
INVENTOR(S) : Antoine Guillet; Fred D. Osterholtz It is certified that error appears in the above-identified patent and that said Letters Patent is hereby corrected as shown below:

Column 16, lines 26-27 (Claim 29):

"$[CH_3(CH_2CH=CH)_3(CH_2)-CO][NCH_2CH_2NH][-CH_2CH_2CH_2Si(OMe_3]_2.$" should read --$[CH_3(CH_2CH=CH)_3(CH_2)_7CO][NCH_2CH_2NH][CH_2CH_2CH_2Si(OMe)_3]_2.$--.

Signed and Sealed this

Twelfth Day of January, 1993

Attest:

DOUGLAS B. COMER

Attesting Officer

Acting Commissioner of Patents and Trademarks